May 9, 1933. C. P. STAUFFER 1,907,889
REPAIR CLAMP FOR PIPES
Filed June 10, 1931
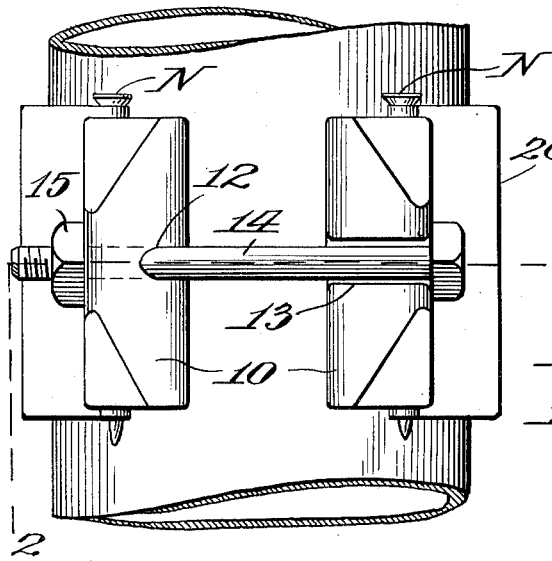
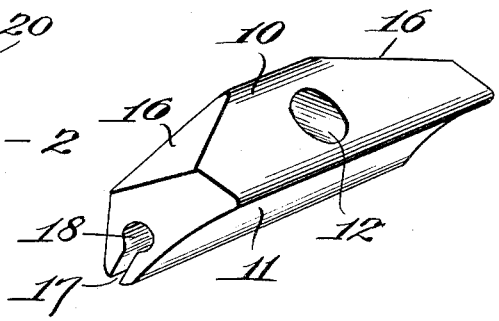
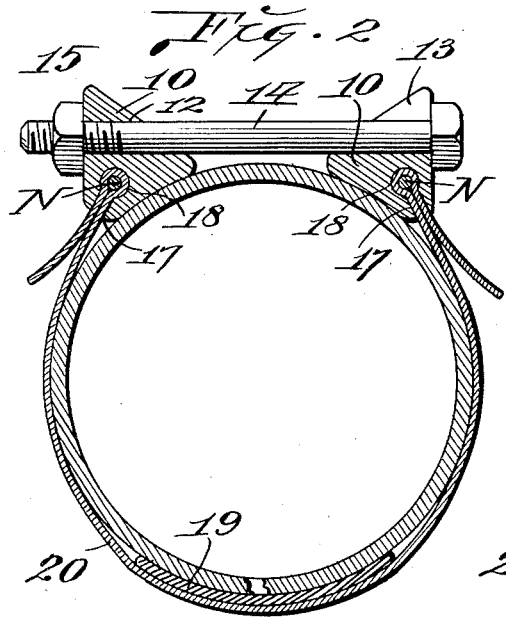
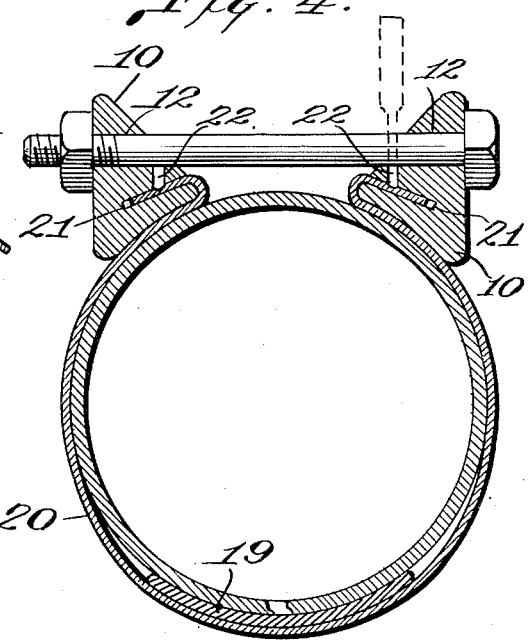
INVENTOR:—
CHARLES P. STAUFFER.
BY Martin P. Smith ATTY.

Patented May 9, 1933

1,907,889

UNITED STATES PATENT OFFICE

CHARLES P. STAUFFER, OF BELL, CALIFORNIA

REPAIR CLAMP FOR PIPES

Application filed June 10, 1931. Serial No. 543,350.

My invention relates to a repair clamp for pipes and has for its principal object, the provision of a relatively simple, practical and inexpensive clamp that may be easily and conveniently applied to water, gas, steam or air pipes for the purpose of closing breaks, openings or punctures therein.

A further object of my invention is, to provide a clamp of the character referred to that includes a pair of blocks which rest directly upon the body of the pipe that is being repaired, said blocks being connected by a bolt and nut which are effective in drawing the blocks together so as to tighten the repair clamp upon the pipe and which blocks are provided with slots for the reception of parts of the thin sheet metal member that encircles the pipe and which holds the patch or closure in position over the opening in the pipe.

With the foregoing and other objects in view, my invention consists in certain novel features of construction and arrangement of parts that will hereinafter be more fully described and claimed and illustrated in the accompanying drawing in which:

Fig. 1 is a plan view of my improved repair clamp in position upon a pipe.

Fig. 2 is a cross section taken on the line 2—2 of Fig. 1.

Fig. 3 is a perspective view of one of the blocks forming a part of my improved repair clamp.

Fig. 4 is a cross section similar to Fig. 2 and showing a modified construction.

Referring by numerals to the accompanying drawing which illustrate a practical embodiment of my invention, 10, 10 designate blocks of cast metal that are practically identical in size, form and construction, each block being substantially triangular in cross section and one of the longitudinal faces of each block is slightly curved in cross section, as designated by 11 so as to fit snugly upon the curved surface of the pipe to which the block is applied.

Formed through one of the blocks at a point intermediate its ends is a transversely disposed aperture 12 and formed through the upper portion of the other block is a transversely disposed slot 13.

A headed bolt 14 passes through the aperture 12 and slot 13, the head of said bolt bearing on one of the faces of the block that is provided with the slot 13 and the threaded end of the bolt that projects through aperture 12 receives a nut 15, which when tightened draws the blocks 10 toward each other.

The outer upper corners of the blocks 10 are preferably cut away, as designated by 16 in order to reduce the weight of the blocks without impairing their efficiency.

Formed in the lower outer corner of each block is a longitudinally disposed slot 17, the inner end of which communicates with a substantially circular bore 18 that extends lengthwise through the block and thus said slot 17 and bore 18 provide a continuous opening through the lower outer corner of the block and which opening is substantially keyhole shape in cross section.

When my improved clamp is applied to a pipe for the purpose of closing a break or opening therein, a section 19 of rubber, composition or other flexible material is placed over the break or opening in the pipe, as illustrated in Fig. 2, and a strap 20 of thin sheet metal is placed over the member 19 and end portions of said sheet metal strap or section are bent double and inserted in the keyhole slots that are formed in the lower outer corners of the blocks 10, with the end portions of the sheet of metal arranged outside the main body portion of said sheet of metal and which body portion encircles the pipe and overlies the flexible closure 19.

In order to secure the doubled ends of the sheet metal to the blocks 10, nails N or pins formed of wire or small metal rods are driven between the layers of sheet metal that occupy the enlarged inner portions of the key-hole slots, thereby forcing the sheet metal outwardly in all directions so as to fill the bores or enlarged portions 18 of the slots and thus the encircling band of sheet metal is very firmly secured to the blocks 10.

To facilitate application of the repair clamp the ends of the sheet metal band are first secured to the blocks 10, as just described and bolt 14 is inserted through opening 12 and the nut 15 applied to the threaded end of said bolt. The device is now applied to the pipe so that the sheet metal band overlies the closure 19 and after the blocks 10 have been brought into position so that their curved faces 11 contact with the pipe, that portion of bolt 14 that is adjacent to the head thereof is positioned in slot 13 and the nut 15 is now tightened or screwed into the bore so as to draw the blocks 10 toward each other and as a result the sheet metal band will be drawn taut so as to firmly retain the patch or closure 19 in position over the opening or break in the pipe.

When the repair clamp is detached from the pipe it is only necessary to unscrew nut 15 so as to loosen bolt 14 and the headed end thereof is now disengaged from the block having the slot 13.

In the modified construction illustrated in Fig. 4, the blocks 10 are provided with kerfs or slots 21 that extend from the lower portions of the inner faces thereof outwardly and downwardly toward the outer faces of said blocks, said slots being of sufficient width to accommodate the ends of the sheet metal band that encircles the pipe and which slots extend throughout the length of the blocks.

When blocks of this form are used, the ends of the sheet metal band pass beneath the curved faces of the blocks and the end portions of said sheet metal band are bent outwardly so as to occupy the slots 21.

In order that the blocks may retain their positions upon the ends of the sheet metal band when applied thereto and while the clamp is being positioned upon a pipe, a suitable tool such as a pin or punch is inserted through apertures 22 that are formed in the blocks and which lead downwardly from the openings 12 to the slots 21 and by striking the punch with a hammer or light tool, the inserted ends of the sheet metal band may be indented or punched so as to temporarily secure the blocks to the ends of the band.

In the event that the repair of the pipe requires an encircling sheet metal member of considerable length, the two or more pairs of the blocks 10 may be utilized in connecting the ends of the elongated sheet metal band.

Thus it will be seen that I have provided a repair clamp for pipes that is relatively simple in construction, inexpensive of manufacture, capable of being easily and quickly applied to or removed from a pipe and said repair clamp being very effective in performing the functions for which it is intended.

It will be understood that minor changes in the size, form and construction of the various parts of my improved repair clamp for pipes may be made and substituted for those herein shown and described without departing from the spirit of my invention, the scope of which is set forth in the appended claim.

I claim as my invention:

A repair clamp for pipes comprising a pair of substantially identical blocks, each having a longitudinally disposed transversely curved bearing surface, the lower portion of each block being provided with a longitudinally disposed slot, the inner end of each slot being increased in width, a sheet metal band having its end portions doubled and seated in the slots in said blocks, means extending through the wider inner portions of said slots and engaging the doubled end portions of the sheet metal band for detachably securing same to said blocks the upper portion of one of said blocks being provided with a transverse aperture, the upper portion of the other block being provided with a transverse slot that is in alignment with the transverse aperture in the other block, a bolt passing through said slot and aperture with the threaded end of said bolt passing through said aperture and a nut on the threaded end of said bolt.

In testimony whereof I affix my signature.

CHARLES P. STAUFFER.